United States Patent
Mashino et al.

(10) Patent No.: US 12,104,004 B2
(45) Date of Patent: Oct. 1, 2024

(54) CHLORINATED VINYL CHLORIDE RESIN

(71) Applicants: SEKISUI CHEMICAL CO., LTD., Osaka (JP); TOKUYAMA SEKISUI CO., LTD., Osaka (JP)

(72) Inventors: Norikazu Mashino, Yamaguchi (JP); Masatoshi Harada, Yamaguchi (JP); Masazumi Okudo, Osaka (JP)

(73) Assignees: SEKISUI CHEMICAL CO., LTD., Osaka (JP); TOKUYAMA SEKISUI CO., LTD., Osaka (JP)

( * ) Notice: Subject to any disclaimer, the term of this patent is extended or adjusted under 35 U.S.C. 154(b) by 143 days.

(21) Appl. No.: 17/437,303

(22) PCT Filed: Mar. 27, 2020

(86) PCT No.: PCT/JP2020/014167
§ 371 (c)(1),
(2) Date: Sep. 8, 2021

(87) PCT Pub. No.: WO2020/203828
PCT Pub. Date: Oct. 8, 2020

(65) Prior Publication Data
US 2022/0177615 A1    Jun. 9, 2022

(30) Foreign Application Priority Data
Mar. 29, 2019 (JP) .................. 2019-068507

(51) Int. Cl.
C08F 8/22 (2006.01)
C08F 114/06 (2006.01)

(52) U.S. Cl.
CPC .............. *C08F 8/22* (2013.01); *C08F 114/06* (2013.01)

(58) Field of Classification Search
CPC .................. C08F 8/22; C08F 114/06
See application file for complete search history.

(56) References Cited

U.S. PATENT DOCUMENTS

2017/0008981 A1    1/2017    Matsumura et al.
2017/0183491 A1*   6/2017    Matsumura .......... C08K 5/1345

FOREIGN PATENT DOCUMENTS

| CN | 104017115 |   | 9/2014 |
|----|-----------|---|--------|
| JP | 62-16283  |   | 1/1987 |
| JP | 01-217008 | * | 8/1989 |
| JP | 2007-171894 |  | 7/2007 |
| JP | 2008-31265 |   | 2/2008 |
| KR | 10-2017-0033261 | | 3/2017 |
| WO | WO 03/074274 | * | 9/2003 |
| WO | 2014/178362 |   | 11/2014 |
| WO | 2015/152260 |   | 10/2015 |

OTHER PUBLICATIONS

Translation of JP 01-217008 (Year: 1989).*
Wachi, AIChE Journal, vol. 34, issues 10, Oct. 1988, p. 1683-1690. (Year: 1988).*
"Chlorinated Polymers", The Chemical Industry Press, Oct. 1983, pp. 34-35, with concise explanation.
International Search Report issued Jun. 16, 2020 in International (PCT) Application No. PCT/JP2020/014167.
Thermal Analysis Application No. HB 223, "Glass transition of PVC and chlorinated PVC", Mettler-Toledo AG, Analytical, Dec. 2009, pp. 1-3.

* cited by examiner

*Primary Examiner* — Robert C Boyle
(74) *Attorney, Agent, or Firm* — Wenderoth, Lind & Ponack, L.L.P.

(57) ABSTRACT

The present invention provides a chlorinated polyvinyl chloride that enables excellent continuous productivity in molding and that enables a molded article to have both processability and unevenness-preventing properties. Provided is a chlorinated polyvinyl chloride having an endothermic peak start temperature (L) and an endothermic peak end temperature (H) that satisfy the following expression (1) in endothermic peak measurement using a differential scanning calorimeter (DSC): 41° C.≤H−L≤98° C. (1).

3 Claims, No Drawings

CHLORINATED VINYL CHLORIDE RESIN

TECHNICAL FIELD

The present invention relates to a chlorinated polyvinyl chloride that enables excellent continuous productivity in molding and that enables a molded article to have both processability and unevenness-preventing properties.

BACKGROUND ART

Polyvinyl chlorides generally have excellent mechanical strength, weather resistance, and chemical resistance, and thus have been processed into various molded bodies and used in various fields.

Polyvinyl chlorides, however, have poor heat resistance. This has led to the development of chlorinated polyvinyl chlorides (CPVCs), which are polyvinyl chlorides chlorinated to have improved heat resistance.

For example, Patent Literature 1 discloses a chlorinated polyvinyl chloride obtained by a specific production method. Patent Literature 1 discloses that such a resin has less initial discoloration in thermal molding and has excellent thermal stability.

CITATION LIST

Patent Literature

Patent Literature 1: WO 2014/178362

SUMMARY OF INVENTION

Technical Problem

However, the chlorinated polyvinyl chloride disclosed in Patent Literature 1 contains many highly chlorinated portions, and thus is easily decomposed by heat in molding and generates a large amount of hydrogen chloride gas, contaminating the die surface. In addition, molded articles obtained in such a manner may have scorch marks, and thus may cause poor continuous productivity in molding and poor molding processability. Moreover, the chlorinated polyvinyl chloride may not provide a uniform molded body because the highly chlorinated portions are difficult to uniformly mix with less chlorinated portions due to their difference in melt viscosity, thus causing great shape unevenness in the resulting molded body.

In view of the technical problems in the prior art, the present invention aims to provide a chlorinated polyvinyl chloride that enables excellent continuous productivity in molding and that enables a molded article to have both processability and unevenness-preventing properties.

Solution to Problem

The present invention relates to a chlorinated polyvinyl chloride having an endothermic peak start temperature (L) and an endothermic peak end temperature (H) that satisfy the following expression (1) in endothermic peak measurement using a differential scanning calorimeter (DSC): 41° C.≤H−L≤98° C. (1).

The present invention is described in detail below.

The chlorinated polyvinyl chloride of the present invention has an endothermic peak start temperature (L) and an endothermic peak end temperature (H) that satisfy the expression (1) in endothermic peak measurement using a differential scanning calorimeter (DSC).

When the above relation is satisfied, molding unevenness can be reduced in a molded body obtained using the chlorinated polyvinyl chloride of the present invention.

The lower limit of the difference between the endothermic peak start temperature (L) and the endothermic peak end temperature (H) is preferably 43° C., more preferably 45° C., and the upper limit thereof is preferably 96° C., more preferably 93° C.

The endothermic peak start temperature (L) and end temperature (H) can be measured by the following method.

Specifically, the chlorinated polyvinyl chloride is heated using a differential scanning calorimetry device from 40° C. to 200° C. at a heating rate of 5° C./min and then cooled from 200° C. to 40° C. at a cooling rate of 5° C./min. The same procedure is performed again, and from the DSC curve obtained in the second heating, data at 0.1-minute intervals from the start of the second heating is extracted so as to graph the difference in heat flow at 0.1-minute intervals. The endothermic peak start temperature (L) and end temperature (H) can be obtained based on the obtained graph.

More specifically, the endothermic peak start temperature (L) is obtained as follows. First, the average difference in heat flow at 0.1-minute intervals in the range of 50° C. to 60° C. is calculated. Next, the average difference in heat flow in the range of 50° C. to 60° C. is subtracted from the difference in heat flow at 0.1 minute-intervals in the temperature range of 60° C. or higher. The first temperature at which the value calculated by the subtraction exceeds 0.00001 W/g ten consecutive times is defined as the endothermic peak start temperature (L).

The endothermic peak end temperature (H) is obtained as follows. The average difference in heat flow in the range of 50° C. to 60° C. is subtracted from the difference in heat flow at 0.1-minute intervals in the temperature range above the temperature at which the maximum difference in heat flow at 0.1-minute intervals occurs. The first temperature at which the value calculated by the subtraction falls below −0.00001 W/g is defined as the endothermic peak end temperature (H).

The lower limit of the endothermic peak start temperature (L) is preferably 77.3° C. and the upper limit thereof is preferably 103.6° C.

The lower limit of the endothermic peak end temperature (H) is preferably 151.8° C. and the upper limit thereof is preferably 166.1° C.

The lower limit of ratio of the endothermic peak start temperature (L) to the endothermic peak end temperature (H) (L/H) is preferably 0.47 and the upper limit thereof is preferably 0.69.

For smoothness improvement and molding unevenness reduction in the resulting molded body, the lower limit of the ratio of the difference (H−L) between the endothermic peak start temperature (L) and the endothermic peak end temperature (H) to the endothermic peak start temperature (L) [(H−L)/L] is preferably 0.41 and the upper limit thereof is preferably 1.25.

In the chlorinated polyvinyl chloride of the present invention, the lower limit of the amount of absorbed heat is preferably 2.531 J/g and the upper limit thereof is preferably 3.046 J/g.

The amount of absorbed heat can be determined from the area of a portion surrounded by a straight line connecting the inflection points of the endothermic peak in a DSC curve and the line defining the endothermic peak.

In the chlorinated polyvinyl chloride of the present invention, the maximum difference in heat flow at 0.1-minute intervals between the endothermic peak start temperature (L) and the endothermic peak end temperature (H) is preferably 0.00021 W/g or more and preferably 0.00037 W/g or less.

In the chlorinated polyvinyl chloride of the present invention, the minimum difference in heat flow at 0.1-minute intervals between the endothermic peak start temperature (L) and the endothermic peak end temperature (H) is preferably 0.00000 W/g or more and preferably 0.00009 W/g or less.

In the chlorinated polyvinyl chloride of the present invention, the ratio of the difference (H−L) between the endothermic peak start temperature (L) and the endothermic peak end temperature (H) to the chlorine content (H−L (° C.)/the chlorine content (% by mass)) is preferably 0.65 or higher and preferably 1.35 or lower.

In the chlorinated polyvinyl chloride of the present invention, the ratio of the difference (H−L) between the endothermic peak start temperature (L) and the endothermic peak end temperature (H) to the amount of added chlorine (H−L (° C.)/the amount of added chlorine (% by mass)) is preferably 4.00 or higher and preferably 8.50 or lower.

Although a polyvinyl chloride typically has a chlorine content of 56.8% by mass, the amount of added chlorine means the proportion of chlorine introduced into a polyvinyl chloride, and can be measured by the method specified in JIS K 7229.

In the chlorinated polyvinyl chloride of the present invention, the ratio of the difference (H−L) between the endothermic peak start temperature (L) and the endothermic peak end temperature (H) to the degree of polymerization (H−L (° C.)/the degree of polymerization) is preferably 0.021 or higher and preferably 0.245 or lower.

Preferably, the chlorinated polyvinyl chloride of the present invention contains structural units (a) to (c) represented by the following formulas (a) to (c), and the proportion of the structural unit (a) is 5.0 mol % or higher, the proportion of the structural unit (b) is 40.0 mol % or lower, and the proportion of the structural unit (c) is 55.0 mol % or lower, relative to the total number of moles of the structural units (a), (b), and (c). Such a chlorinated polyvinyl chloride shows uniform gelling characteristics in melt molding and can provide a molded article with less unevenness on the surface.

In the chlorinated polyvinyl chloride of the present invention, the proportion of the structural unit (a) is preferably 5.0 mol % or higher, more preferably 30.0 mol % or higher, still more preferably 35.0 mol % or higher, and preferably 90.0 mol % or lower, more preferably 60.0 mol % or lower, relative to the total number of moles of structural units (a), (b), and (c).

The proportion of the structural unit (b) is preferably 5.0 mol % or higher, more preferably 15.0 mol % or higher, and preferably 40.0 mol % or lower, more preferably 30.0 mol % or lower, still more preferably 25.0 mol % or lower, relative to the total number of moles of structural units (a), (b), and (c).

The proportion of the structural unit (c) is preferably 5.0 mol % or higher, more preferably 25.0 mol % or higher, and preferably 55.0 mol % or lower, more preferably 40.0 mol % or lower, relative to the total number of moles of structural units (a), (b), and (c).

[Chem. 1]

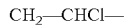  (a)

$CH_2-CCl_2-$  (b)

$-CHCl-CHCl-$  (c)

The molar ratios of the structural units (a), (b), and (c) in the chlorinated polyvinyl chloride reflect the site to which chlorine is introduced at the time of chlorination of the polyvinyl chloride (PVC). The PVC prior to chlorination is in a state where the proportion of the structural unit (a) is 100 mol %, and the proportions of the structural units (b) and (C) are 0 mol %. As chlorination proceeds, the proportion of the structural unit (a) decreases, while the proportions of the structural units (b) and (c) increase. At this time, nonuniformity of the chlorinated state will increase in a case where the proportion of the structural unit (b), which is unstable, excessively increases, or in a case where the chlorinated site and the unchlorinated site are unevenly present within the same particle of the chlorinated polyvinyl chloride. An increase in this nonuniformity causes variations in gelling characteristics in melt kneading of the chlorinated polyvinyl chloride, which will severely impair the smoothness of the molded article surface.

In contrast, in the present invention, setting the molar ratios of the structural units (a), (b), and (c) within the above range enables the chlorinated polyvinyl chloride to have high uniformity and exhibit good gelling characteristics in melt kneading.

The molar ratios of the structural units (a), (b), and (c) in the chlorinated polyvinyl chloride of the present invention can be measured by molecular structure analysis using NMR. NMR analysis can be performed in accordance with the method described in R. A. Komoroski, R. G. Parker, J. P. Shocker, Macromolecules, 1985, 18, 1257-1265.

The chlorinated polyvinyl chloride of the present invention may contain a different structural unit other than the structural units (a), (b), and (c) as long as the effects of the present invention are not impaired.

The amount of the different structural unit is preferably 0% by mass or more, and preferably less than 10% by mass.

In the chlorinated polyvinyl chloride of the present invention, the amount of added chlorine is preferably 3.2 to 15.2% by mass.

When the amount of added chlorine is 3.2% by mass or more, the molded article has sufficient heat resistance. When the amount of added chlorine is 15.2% by mass or less, moldability is improved.

The amount of added chlorine is more preferably 5.2% by mass or more, and more preferably 12.2% by mass or less.

The amount of added chlorine is more preferably 8.2% by mass or more, and more preferably 11.2% by mass or less.

Although a polyvinyl chloride typically has a chlorine content of 56.8% by mass, the amount of added chlorine means the proportion of chlorine introduced to a polyvinyl chloride, and can be measured by the method specified in JIS K 7229.

In the chlorinated polyvinyl chloride of the present invention, for a more uniform chlorinated state and for prevention of scorch marks in molding, the ratio of the proportion of the structural unit (b) to the amount of added chlorine (the proportion of the structural unit (b)/the amount of added chlorine) is preferably 0.1 or higher and preferably 4.0 or lower.

The degree of polymerization of the chlorinated polyvinyl chloride of the present invention is not limited, and is preferably 400 or higher, more preferably 500 or higher, and preferably 2,000 or lower, more preferably 1,500 or lower.

When the degree of polymerization is within the above range, fluidity in injection and the strength of the molded article can be both achieved.

The chlorinated polyvinyl chloride of the present invention is a resin obtained by the chlorination of a polyvinyl chloride.

The polyvinyl chloride used may be a vinyl chloride homopolymer, or may be a copolymer of a vinyl chloride monomer and a monomer with unsaturated bond(s) that is copolymerizable with the vinyl chloride monomer, a graft copolymer obtained by graft-copolymerizing a vinyl chloride monomer to a polymer, or the like. These polymers may be used singly or in combinations of two or more.

When the polyvinyl chloride is a copolymer, the amount of a component derived from the vinyl chloride monomer in the polyvinyl chloride is preferably 90% by mass or more and preferably 100% by mass or less.

Examples of the monomer with unsaturated bond(s) that is copolymerizable with the vinyl chloride monomer include α-olefins, vinyl esters, vinyl ethers, (meth)acrylates, aromatic vinyls, vinyl halides, and N-substituted maleimides. These monomers may be used singly or in combinations of two or more.

Examples of the α-olefins include ethylene, propylene, and butylene. Examples of the vinyl esters include vinyl acetate and vinyl propionate. Examples of the vinyl ethers include butyl vinyl ether and cetyl vinyl ether.

Examples of the (meth)acrylates include methyl (meth)acrylate, ethyl (meth)acrylate, butyl acrylate, and phenyl methacrylate. Examples of the aromatic vinyls include styrene and α-methyl styrene.

Examples of the vinyl halides include vinylidene chloride and vinylidene fluoride. Examples of the N-substituted maleimides include N-phenyl maleimide and N-cyclohexyl maleimide.

Preferred among these are ethylene and vinyl acetate.

The polymer to which vinyl chloride is graft copolymerized is not limited as long as vinyl chloride can be graft copolymerized. Examples of such a polymer include ethylene-vinyl acetate copolymers, ethylene-vinyl acetate-carbon monoxide copolymers, ethylene-ethyl acrylate copolymers, ethylene-butyl acrylate-carbon monoxide copolymers, ethylene-methyl methacrylate copolymers, and ethylene-propylene copolymers. Examples also include acrylonitrile-butadiene copolymers, polyurethane, chlorinated polyethylene, and chlorinated polypropylene. These may be used singly or in combination of two or more.

The method of polymerizing the polyvinyl chloride is not limited, and a conventionally known method such as aqueous suspension polymerization, block polymerization, solution polymerization, or emulsion polymerization can be used.

The chlorinated polyvinyl chloride of the present invention may be produced by, for example, a method including preparing a suspension in a reaction vessel by suspending a polyvinyl chloride in an aqueous medium, introducing chlorine into the reaction vessel, and heating the suspension to chlorinate the polyvinyl chloride.

The difference (H−L) between the endothermic peak start temperature (L) and the endothermic peak end temperature (H) can be adjusted by changing conditions for the polyvinyl chloride chlorination such as pressure, temperature, chlorine concentration, hydrogen peroxide concentration, chlorine consumption rate, stirring conditions, light energy irradiation intensity, and light wavelength.

The reaction vessel used may be a commonly used vessel such as a glass-lined stainless steel reaction vessel or titanium reaction vessel, for example.

The method of preparing the suspension of the polyvinyl chloride in an aqueous medium is not limited. For example, a cake-like PVC obtained by subjecting a polymerized PVC to monomer removal treatment may be used, or a dried PVC may be resuspended in an aqueous medium, or a suspension obtained by removing any substance undesired for the chlorination reaction from the polymerization system may be used. It is preferred to use a cake-like resin obtained by subjecting a polymerized PVC to monomer removal treatment.

The aqueous medium used may be ion-exchange-treated pure water, for example. While the amount of the aqueous medium is not limited, generally, it is preferably 150 to 400 parts by mass based on 100 parts by mass of the PVC.

Chlorine to be introduced into the reaction vessel may be either liquid chlorine or gaseous chlorine. The use of liquid chlorine is efficient in that a large amount of chlorine can be charged into the reaction vessel in a short period of time. Chlorine may be added in the course of reaction to adjust the pressure or supply chlorine. At this time, gaseous chlorine in addition to liquid chlorine may be blown into the reaction vessel, as required. It is preferred to use chlorine after purging 5 to 10% by mass of chlorine from the cylinder.

While the gauge pressure in the reaction vessel is not limited, it is preferably from 0 to 2 MPa, because the higher the chlorine pressure is, the more readily the chlorine will penetrate into the PVC particles.

The method of chlorinating the PVC in the suspended state is not limited. Examples of chlorination method include a method in which the excitation of bonding of the PVC and chlorine is brought about by thermal energy to accelerate the chlorination (hereinafter referred to as thermal chlorination); and a method in which light energy such as ultraviolet light is applied to accelerate the chlorination by photoreaction (hereinafter referred to as photo-chlorination). The heating method in the chlorination by thermal energy is not limited, and for example, heating with an external jacket from the reactor wall is effective. The use of light energy such as ultraviolet light requires an apparatus capable of light energy irradiation such as ultraviolet irradiation under high temperature and high pressure conditions. In the photo-chlorination, the chlorination reaction temperature is preferably 40° C. to 80° C. In the photo-chlorination, the ratio of the light energy irradiation intensity (W) to the total amount (kg) of the raw material PVC and water is preferably 0.001 to 6 (W/kg). The irradiation light preferably has a wavelength of 280 to 420 nm.

Preferred among the above chlorination methods is a thermal chlorination method involving no ultraviolet irradiation. Preferred is a method in which the excitation of bonding of the polyvinyl chloride and chlorine is brought about by heat alone or by heat and hydrogen peroxide to accelerate the chlorination reaction.

In the case of the chlorination reaction by light energy, the amount of light energy needed to chlorinate the PVC is greatly affected by the distance between the PVC and the light source. Thus, the amount of received energy is different inside and on the surface of the PVC particles, so that chlorination does not occur uniformly. As a result, a CPVC with reduced uniformity is obtained. In contrast, with the method of chlorination by heat without ultraviolet irradiation, a more uniform chlorination reaction occurs to produce a CPVC with increased uniformity.

The chlorination by heat alone is preferably performed at a temperature of 40° C. to 120° C. When the temperature is excessively low, the rate of chlorination will decrease. When the temperature is excessively high, dehydrochlorination reaction will occur along with the chlorination reaction, which causes discoloration of the resulting CPVC. The heating temperature is more preferably 50° C. to 110° C. The heating method is not limited, and heating may be performed with an external jacket from the reaction vessel wall, for example.

In the chlorination, hydrogen peroxide is preferably further added to the suspension. The addition of hydrogen peroxide can improve the rate of chlorination. Hydrogen peroxide is preferably added in an amount of 5 to 500 ppm to the PVC per hour of the reaction time. When the amount of hydrogen peroxide added is excessively small, the effect of improving the rate of chlorination cannot be obtained. When the amount of hydrogen peroxide added is excessively large, the thermal stability of the CPVC will decrease.

When hydrogen peroxide is added as described above, the rate of chlorination is improved, so that the heating temperature can be set relatively low. The heating temperature may be 65° C. to 110° C., for example.

During the chlorination, it is preferred to perform chlorination at a chlorine consumption rate of 0.010 to 0.015 kg/PVC–kg·5 min after the amount of added chlorine reaches a value that is five percentage points by mass lower than the final amount of added chlorine, and further perform chlorination at a chlorine consumption rate of 0.005 to 0.010 kg/PVC–kg·5 min after the amount of added chlorine reaches a value that is three percentage points by mass lower than the final amount of added chlorine. As used herein, the term "chlorine consumption rate" refers to the amount of chlorine consumed in 5 minutes per kilogram of the raw material PVC.

When chlorination is performed using the above method, a CPVC having less nonuniformity in the chlorinated state and having excellent thermal stability can be obtained.

In the above chlorination method, preferably, the chlorination is performed while the suspension is stirred. The suspension is stirred preferably under such conditions that the ratio of the vortex volume (unit: L) to the total mass (kg) of the raw material PVC and water is 0.009 to 0.143 (L/kg).

When the ratio is 0.009 (L/kg) or higher, chlorine in the gas phase in the reaction vessel can be sufficiently taken in the liquid phase. When the ratio is 0.143 (L/kg) or lower, the chlorine taken in the liquid phase is less likely to be re-released into the gas phase, allowing uniform chlorination.

The vortex volume means the volume of a vortex formed at the liquid-gas interface during stirring.

For example, the vortex volume can be calculated using thermal fluid and powder analysis software "R-FLOW" (produced by R-flow Corporation Ltd.).

Specifically, the vortex volume can be calculated based on the distance between the center of the stirring blade and the interface between the gas phase and the liquid phase in stirring. Here, the stirring blade, which is the stirring power, produces pressure in the liquid and sets the liquid phase at a positive pressure and the gas phase at a negative pressure. This makes it possible to determine the interface of the gas phase and the liquid phase as the border between the positive pressure and the negative pressure.

The stirring blade rotation rate in stirring is preferably 10 to 500 rpm. The capacity of the reaction vessel is preferably 0.01 m$^3$ to 100 m$^3$.

The height of the stirring blade is preferably adjusted such that the ratio of the distance from the liquid surface to the stirring blade to the height of the liquid surface (the distance from the liquid surface to the stirring blade/the height of the liquid surface) in stirring is 0.05 to 0.70 (m/m). The height of the liquid surface means the distance from the bottom of the reaction vessel to the raw material liquid surface when the raw material is fed into the reaction vessel. The distance from the liquid surface to the stirring blade means the distance from the liquid surface to the uppermost portion of the stirring blade.

The ratio of the stirring blade diameter to the reaction vessel diameter (the stirring blade diameter/the reaction vessel diameter) is preferably 0.3 (m/m) or more and preferably 0.9 (m/m) or less.

In the above chlorination method, the concentration of chlorine introduced into the reaction vessel is preferably 99.5% or higher.

A molded body can be produced by molding a resin composition for molding containing the chlorinated polyvinyl chloride of the present invention.

The present invention also encompasses a resin composition for molding containing the chlorinated polyvinyl chloride of the present invention.

The lower limit of the amount of the chlorinated polyvinyl chloride of the present invention in the resin composition for molding of the present invention is preferably 65% by mass, more preferably 70% by mass and the upper limit thereof is preferably 96% by mass, more preferably 93% by mass.

The resin composition for molding of the present invention may optionally contain additives such as stabilizers, lubricants, processing aids, impact modifiers, heat resistance improvers, antioxidants, ultraviolet absorbents, light stabilizers, fillers, thermoplastic elastomers, and pigments.

Examples of the stabilizers include, but are not limited to, thermal stabilizers and thermal stabilization aids. Examples of the thermal stabilizers include, but are not limited to, organotin stabilizers, lead stabilizers, calcium-zinc stabilizers, barium-zinc stabilizers, and barium-cadmium stabilizers.

Examples of the organotin stabilizers include dibutyl tin mercapto, dioctyl tin mercapto, dimethyl tin mercapto, dibutyl tin mercapto, dibutyl tin maleate, dibutyl tin maleate polymers, dioctyl tin maleate, dioctyl tin maleate polymers, dibutyl tin laurate, and dibutyl tin laurate polymers.

Examples of the lead stabilizers include lead stearate, dibasic lead phosphite, and tribasic lead sulfate. These may be used singly or in combination of two or more thereof.

Examples of the thermal stabilization aids include, but are not limited to, epoxidized soybean oil, phosphate, polyol, hydrotalcite, and zeolite. These may be used singly or in combination of two or more thereof.

Examples of the lubricants include internal lubricants and external lubricants.

The internal lubricants are used to reduce the fluid viscosity of the molten resin in molding to prevent the generation of frictional heat. Examples of the internal lubricants include, but are not limited to, butyl stearate, lauryl alcohol, stearyl alcohol, epoxidized soybean oil, glycerol monostearate, stearic acid, and bisamide. These may be used singly or in combinations of two or more.

The external lubricants are used to improve the slip effect between metal surfaces and the molten resin in molding. Examples of the external lubricants include, but are not limited to, paraffin wax, polyolefin waxes, ester waxes, and montanic acid wax. These may be used singly or in combinations of two or more.

Examples of the processing aids include, but are not limited to, acrylic processing aids such as alkyl acrylate-alkyl methacrylate copolymers having a mass average molecular weight of 100,000 to 2,000,000. Examples of the acrylic processing aids include, but are not limited to, n-butyl acrylate-methyl methacrylate copolymers and 2-ethylhexyl acrylate-methyl methacrylate-butyl methacrylate copolymers. These may be used singly or in combination of two or more thereof.

Examples of the impact modifiers include, but are not limited to, methyl methacrylate-butadiene-styrene copolymers (MBS), chlorinated polyethylene, and acrylic rubber.

Examples of the heat resistance improvers include, but are not limited to, α-methylstyrene resins and N-phenylmaleimide resins.

Examples of the antioxidants include, but are not limited to, phenolic antioxidants.

Examples of the light stabilizers include, but are not limited to, hindered amine light stabilizers.

Examples of the ultraviolet absorbents include, but are not limited to, salicylate ultraviolet absorbents, benzophenone ultraviolet absorbents, benzotriazole ultraviolet absorbents, and cyanoacrylate ultraviolet absorbents.

Examples of the fillers include, but are not limited to, calcium carbonate and talc.

Examples of the pigments include, but are not limited to, organic pigments such as azo pigments, phthalocyanine pigments, threne pigments, and dye lake pigments; and inorganic pigments such as oxide pigments, molybdenum chromate pigments, sulfide/selenide pigments, and ferrocyanide pigments.

Further, a molded body molded from the resin composition for molding of the present invention is provided. The present invention also encompasses such a molded body.

The molding method may be any conventionally known molding method, for example, extrusion molding or injection molding.

The molded body of the present invention has excellent thermal stability and good appearance. The molded body of the present invention can therefore be suitably used in applications such as building components, plumbing materials and equipment, and housing materials.

In the molded body of the present invention, the lower limit of the developed interfacial area ratio (Sdr) is preferably 0.0001 and the upper limit thereof is preferably 0.003. This allows the molded body to have a uniform surface.

The Sdr can be measured using a 3D measurement system (produced by Keyence Corporation, VR-3100), for example.

The molded body of the present invention preferably has a surface roughness (Rmax) of 1.0 μm or less.

The molded body of the present invention preferably has a filtered waviness center line average (WcA) at an outer surface of 5.0 μm or less. Such a molded body has less surface unevenness and less thickness variations. In the present invention, the filtered waviness center line average as well as the surface roughness is low, which allows the molded body to have less friction with flowing water and to increase the flow rate when used as a pipe or the like.

The surface roughness (Rmax) can be measured by a method in accordance with JIS B 0601. The filtered waviness center line average (WcA) can be measured by a method in accordance with JIS B 0610.

Advantageous Effects of Invention

The present invention can provide a chlorinated polyvinyl chloride that enables excellent continuous productivity in molding and that enables a molded article to have both processability and unevenness-preventing properties.

DESCRIPTION OF EMBODIMENTS

The present invention is hereinafter described in more detail with reference to examples; however, the present invention should not be limited to these examples.

Example 1

A glass-lined reaction vessel having an inner capacity of 300 L was charged with 130 kg of ion-exchanged water and 50 kg of a polyvinyl chloride having an average degree of polymerization of 1,000. They were stirred to disperse the polyvinyl chloride in water to prepare an aqueous suspension, and then the inside of the reaction vessel was heated to raise the temperature of the aqueous suspension to 70° C. Subsequently, the inside of the reaction vessel was depressurized to remove oxygen (oxygen content 100 ppm). Thereafter, while stirring was performed with a stirring blade such that the vortex formed at the liquid-gas interface by stirring had a vortex volume of 2.5 L, chlorine (oxygen content 50 ppm) was introduced at a partial pressure of chlorine of 0.04 MPa, and the suspension was irradiated with ultraviolet light having a wavelength of 365 nm at an irradiation intensity of 160 W using a high-pressure mercury lamp, thereby starting chlorination reaction. At this time, the height of the stirring blade was adjusted such that the ratio of the distance from liquid surface to the stirring blade to the height of the liquid surface (the distance from the liquid surface to the stirring blade/the height of the liquid surface) was 0.155 (m/m). The ratio of the stirring blade diameter to the reaction vessel diameter (the stirring blade diameter/the stirring blade diameter) was 0.54 (m/m).

Then, the chlorination temperature was kept at 70° C., the partial pressure of chlorine was kept at 0.04 MPa, and the average chlorine consumption rate was adjusted to 0.02 kg/PVC–kg·5 min. When the amount of added chlorine reached 10.6% by mass, the ultraviolet irradiation using the high-pressure mercury lamp and the chlorine gas supply were terminated, whereby chlorination was completed.

Subsequently, unreacted chlorine was removed by nitrogen gas aeration, and the obtained chlorinated polyvinyl chloride slurry was neutralized with sodium hydroxide, washed with water, dehydrated, and then dried. Thus, a powdery, photo-chlorinated polyvinyl chloride (amount of added chlorine: 10.6% by mass) was obtained.

Examples 2 to 4 and Comparative Example 1

Chlorinated polyvinyl chlorides were obtained as in Example 1 except that the reaction temperature, the vortex volume in stirring, the distance from the liquid surface to the stirring blade/the height of liquid surface, the average chlorine consumption rate were changed as shown in Tables 1 and 2.

Example 5

A glass-lined reaction vessel having an inner capacity of 300 L was charged with 130 kg of ion-exchanged water and 50 kg of a polyvinyl chloride having an average degree of polymerization of 1,000. They were stirred to disperse the polyvinyl chloride in water to prepare an aqueous suspension, and then the inside of the reaction vessel was heated to raise the temperature of the aqueous suspension to 100° C.

Subsequently, the inside of the reaction vessel was depressurized to remove oxygen (oxygen content 100 ppm). Thereafter, while stirring was performed with a stirring blade such that the vortex formed at the liquid-gas interface by stirring had a vortex volume of 8.3 L, chlorine (oxygen content 50 ppm) was introduced at a partial pressure of chlorine of 0.40 MPa, thereby starting thermal chlorination. At this time, the height of the stirring blade was adjusted such that the ratio of the distance from liquid surface to the stirring blade to the height of the liquid surface (the distance from the liquid surface to the stirring blade/the height of the liquid surface) was 0.390 (m/m). The ratio of the stirring blade diameter to the reaction vessel diameter (the stirring blade diameter/the reaction vessel diameter) was 0.54 (m/m).

Then, the chlorination temperature was kept at 100° C. and the partial pressure of chlorine was kept at 0.40 MPa. After the amount of added chlorine reached 4.2% by mass, addition of a 200 ppm hydrogen peroxide solution was started at 15 ppm/Hr in terms of hydrogen peroxide relative to the polyvinyl chloride, and the average chlorine consumption rate was adjusted to 0.02 kg/PVC–kg·5 min. Thereafter, when the amount of added chlorine reached 10.3% by mass, the supply of hydrogen peroxide solution and chlorine gas was terminated, whereby chlorination was completed.

Subsequently, unreacted chlorine was removed by nitrogen gas aeration, and the obtained chlorinated polyvinyl chloride slurry was neutralized with sodium hydroxide, washed with water, dehydrated, and then dried. Thus, a powdery, thermally chlorinated polyvinyl chloride (amount of added chlorine: 10.3% by mass) was obtained.

Examples 6 to 10 and Comparative Examples 2 to 9

Chlorinated polyvinyl chlorides were obtained as in Example 5 except that the reaction temperature, the vortex volume in stirring, the distance from the liquid surface to the stirring blade/the height of the liquid surface, the average chlorine consumption rate, and the amount of 200 ppm hydrogen peroxide added were changed as shown in Tables 1 and 2.

Examples 11 to 13

Chlorinated polyvinyl chlorides were obtained as in Example 5 except that the average degree of polymerization of the polyvinyl chloride, the vortex volume in stirring, the distance from the liquid surface to the stirring blade/the height of the liquid surface, and the average chlorine consumption rate were changed as shown in Table 1.

(Evaluation)

The chlorinated polyvinyl chlorides obtained in the examples and the comparative examples were evaluated as follows. Tables 1 and 2 show the results.

(1) Amount of Added Chlorine

The amount of added chlorine was measured for each of the obtained chlorinated polyvinyl chlorides in conformity with JIS K 7229.

(2) Molecular Structure Analysis

The molecular structure of each of the obtained chlorinated polyvinyl chlorides was analyzed in conformity with the NMR measurement method described in R. A. Komoroski, R. G. Parker, J. P. Shocker, Macromolecules, 1985, 18, 1257-1265 so as to determine the amount of the structural units (a), (b), and (c).

The NMR measurement conditions were as follows.
Apparatus: FT-NMRJEOLJNM-AL-300
  Measured nuclei: 13C (proton complete decoupling)
  Pulse width: 90°
  PD: 2.4 sec
  Solvent: o-dichlorobenzene:deuterated benzene (C5D5)=3:1
  Sample concentration: about 20%
  Temperature: 110° C.
  Reference material: central signal for benzene set to 128 ppm
  Number of scans: 20,000

(3) Differential Scanning Calorimetry (DSC)

Each of the obtained chlorinated polyvinyl chlorides was heated using a differential scanning calorimetry (DSC) device (produced by TA Instruments Waters Corporation, DSC Q20) from 40° C. to 200° C. at a heating rate of 5° C./min and then cooled from 200° C. to 40° C. at a cooling rate of 5° C./min.

The same procedure was performed again, and from the DSC curve obtained in the second heating, data at 0.1-minute intervals from the start of the second heating was extracted so as to graph the difference in heat flow at 0.1-minute intervals. The maximum and minimum differences in heat flow at 0.1-minute intervals were determined, and then the average difference in heat flow in the range of 50° C. to 60° C. was calculated. The average difference in heat flow in the range of 50° C. to 60° C. was subtracted from the difference in heat flow at 0.1 minute-intervals in the temperature range of 60° C. or higher. The first temperature at which the value calculated by the subtraction exceeded 0.00001 ten consecutive times was determined, whereby the endothermic peak start temperature (L) was determined. Further, the average difference in heat flow in the range of 50° C. to 60° C. was subtracted from the difference in heat flow at 0.1-minute intervals in the temperature range above the temperature at which the maximum difference in heat flow at 0.1-minute intervals occurred. The first temperature at which the value calculated by the subtraction falls below −0.00001 was determined, whereby the end temperature of the endothermic peak (H) was determined. H−L was calculated based on the endothermic peak start temperature (L) and the endothermic peak end temperature (H).

(4) Developed Interfacial Area Ratio (Sdr)

(Production of Chlorinated Polyvinyl Chloride Composition)

An amount of 5.5 parts by mass of an impact resistance modifier was added to 100 parts by mass of each of the obtained chlorinated polyvinyl chlorides. Then, 1.5 parts by mass of a thermal stabilizer was added and mixed. The impact resistance modifier used was Kane Ace B-564 (produced by Kaneka Corporation, methyl methacrylate-butadiene-styrene copolymer). The thermal stabilizer used was TVS*1380 (produced by Nitto Kasei Co., Ltd., organotin stabilizer).

Further, 2.0 parts by mass of a polyethylene lubricant (produced by Mitsui Chemicals, Inc., Hiwax 220MP) and 0.3 parts by mass of a fatty acid ester lubricant (produced by Emery Oleochemicals Japan Ltd., LOXIOL G-32) were added. They were uniformly mixed in a super mixer, whereby a chlorinated polyvinyl chloride composition was obtained.

(Production of Extrusion-Molded Body)

The obtained chlorinated polyvinyl chloride composition was fed into a twin-screw counter-rotating conical extruder with a diameter of 50 mm (produced by Osada Seisakusho, SLM-50) to prepare a sheet-shaped molded body with a thickness of 2 mm and a width of 80 mm at a resin temperature of 205° C., a back pressure of 130 kg/cm², and an extrusion amount of 40 kg/hr.
(Sdr Measurement)

The Sdr value of a surface of the obtained molded body was measured using a 3D measurement system (produced by Keyence Corporation, VR-3100). Each Sdr value shown in Table 1 is the average of five measurement regions.

Sdr is a ratio representing the degree of increase in the surface area of the measured region compared to the area of the measured region. A completely level surface has an Sdr of 0. A molded body having a low Sdr has excellent smoothness. Using such a molded body as, for example, a pipe-shaped molded body for plumbing or the like can reduce noise when water is running.

(5) Scorch Marks (Discoloration) of Molded Body

The surface state of the obtained molded body was visually examined and evaluated in accordance with the following criteria.
- ○ (Good): No scorch mark (discoloration) was observed.
- x (Poor): Scorch mark(s) (discoloration) was/were observed.

(6) Surface Shape (Unevenness)

The surface shape of the molded body was examined visually and by touch, and evaluated in accordance with the following criteria.

- ○ (Good): Neither the visual examination nor the touch examination found surface irregularities.
- Δ (Fair): The visual examination found no surface irregularities but the touch examination found surface irregularities.
- x (Poor) The visual examination found surface irregularities.

(7) Continuous Productivity

The obtained chlorinated polyvinyl chloride composition was fed into a twin-screw counter-rotating conical extruder with a diameter of 50 mm (produced by Osada Seisakusho, "SLM-50") to prepare sheet-shaped molded bodies with a thickness of 2 mm and a width of 80 mm at a resin temperature of 205° C., a back pressure of 130 kg/cm², and an extrusion amount of 40 kg/hr. The time from the start of the molding to the occurrence of a scorch mark (discoloration) in the obtained molded body was measured, and the continuous productivity was evaluated.

A longer time before the occurrence of a scorch mark (discoloration) in the molded body indicates that the chlorinated polyvinyl chloride is less likely to contaminate the die surface and enables excellent continuous productivity when products are continuously produced by repeating similar operations for a long time.

TABLE 1

|  |  |  |  | Examples | | | | |
|---|---|---|---|---|---|---|---|---|
|  |  |  |  | 1 | 2 | 3 | 4 | 5 |
| Production method | Raw material | Average degree of polymerization | | 1000 | 1000 | 1000 | 1000 | 1000 |
|  | PVC | Charge amount | kg | 50 | 50 | 50 | 50 | 50 |
|  | Water | Ion-exchanged water | kg | 130 | 130 | 130 | 130 | 130 |
|  | Chlorination conditions | Reaction temperature | ° C. | 70 | 100 | 100 | 100 | 100 |
|  |  | Reacton pressure | Mpa | 0.04 | 0.40 | 0.40 | 0.40 | 0.40 |
|  |  | PVC + water | kg | 180 | 180 | 180 | 180 | 180 |
|  |  | Vortex volume in stirring | L | 2.5 | 7.5 | 25.2 | 27 | 8.3 |
|  |  | Vortex volume/ (PVC + water) | L/kg | 0.014 | 0.042 | 0.140 | 0.150 | 0.046 |
|  |  | (Distance from liquid surface to stirring blade)/ Height of liquid surface | m/m | 0.155 | 0.365 | 0.684 | 0.690 | 0.390 |
|  |  | Average chlorine consumption rate | kg/pvc – kg · 5 min | 0.02 | 0.006 | 0.012 | 0.005 | 0.02 |
|  |  | 200 ppm hydrogen peroxide | ppm/hr | — | — | — | — | 15 |
|  |  | Peak wavelength | nm | 365 | 365 | 365 | 365 | — |
| Chlorinated polyvinyl chloride | Amount of added chlorine | | mass % | 10.6 | 10.5 | 10.5 | 10.5 | 10.3 |
|  | Structure | Structural unit (a) —$CH_2$—CHCl— | mol % | 35.8 | 35.7 | 35.3 | 34.6 | 36.9 |
|  |  | Structural unit (b) —$CH_2$—$CCl_2$— | mol % | 24.6 | 24 | 24 | 32 | 24 |
|  |  | Structural unit (c) —CHCl—CHCl— | mol % | 39.6 | 40.3 | 40.7 | 33.4 | 39.1 |
|  | DSC | Start temperature (L) | ° C. | 104 | 105 | 76 | 74 | 86 |
|  |  | End temperature (H) | ° C. | 150 | 153 | 169 | 171 | 156 |
|  |  | H – L | ° C. | 46 | 48 | 93 | 97 | 70 |
|  |  | Maximum heat flow difference | W/g | 0.00036 | 0.00037 | 0.00023 | 0.00020 | 0.00030 |
|  |  | Minimum heat flow difference | W/g | 0.00001 | 0.00007 | 0.00003 | 0.00004 | 0.00000 |
|  |  | Amount of absorbed heat | J/g | 3.046 | 2.746 | 2.585 | 2.466 | 2.821 |
| Molded body |  | Sdr | | 0.0001 | 0.0014 | 0.0029 | 0.0029 | 0.0013 |
|  |  | Scorch mail (discoloration) | | ○ | ○ | ○ | ○ | ○ |
|  |  | Surface shape (unevenness) | | ○ | ○ | ○ | ○ | ○ |
|  |  | Continuous productivity (hr) | | 10.5 | 10 | 6 | 4 | 11.5 |

TABLE 1-continued

|  |  |  |  | Examples | | | | |
|---|---|---|---|---|---|---|---|---|
|  |  |  |  | 6 | 7 | 8 | 9 | 10 |
| Production method | Raw material PVC | Average degree of polymerization |  | 1000 | 1000 | 1000 | 1000 | 1000 |
|  |  | Charge amount | kg | 50 | 50 | 50 | 50 | 50 |
|  | Water | Ion-exchanged water | kg | 130 | 130 | 130 | 130 | 130 |
|  | Chlorination conditions | Reaction temperature | ° C. | 100 | 100 | 100 | 100 | 100 |
|  |  | Reacton pressure | Mpa | 0.40 | 0.40 | 0.40 | 0.40 | 0.40 |
|  |  | PVC + water | kg | 180 | 180 | 180 | 180 | 180 |
|  |  | Vortex volume in stirring | L | 19.6 | 7.5 | 7.6 | 7.5 | 1.8 |
|  |  | Vortex volume/ (PVC + water) | L/kg | 0.109 | 0.042 | 0.042 | 0.042 | 0.010 |
|  |  | (Distance from liquid surface to stirring blade)/ Height of liquid surface | m/m | 0.480 | 0.374 | 0.374 | 0.374 | 0.104 |
|  |  | Average chlorine consumption rate | kg/pvc − kg · 5 min | 0.02 | 0.011 | 0.006 | 0.005 | 0.006 |
|  |  | 200 ppm hydrogen peroxide | ppm/hr | 15 | 15 | 15 | 15 | 15 |
|  |  | Peak wavelength | nm | — | — | — | — | — |
| Chlorinated polyvinyl chloride |  | Amount of added chlorine | mass % | 10.6 | 5.3 | 12.5 | 15.5 | 10.5 |
|  | Structure | Structural unit (a) —CH$_2$—CHCl— | mol % | 35.5 | 67.5 | 24 | 5.4 | 35.3 |
|  |  | Structural unit (b) —CH$_2$—CCl$_2$— | mol % | 24.7 | 9 | 28 | 39.8 | 24.8 |
|  |  | Structural unit (c) —CHCl—CHCl— | mol % | 39.8 | 23.5 | 48 | 54.8 | 39.9 |
|  | DSC | Start temperature (L) | ° C. | 76 | 86 | 103 | 123 | 105 |
|  |  | End temperature (H) | ° C. | 165 | 130 | 165 | 187 | 154 |
|  |  | H − L | ° C. | 89 | 44 | 62 | 65 | 49 |
|  |  | Maximum heat flow difference | W/g | 0.00021 | 0.00023 | 0.00035 | 0.00037 | 0.00038 |
|  |  | Minimum heat flow difference | W/g | 0.00010 | 0.00006 | 0.00007 | 0.00013 | 0.00007 |
|  |  | Amount of absorbed heat | J/g | 2.599 | 3.010 | 2.582 | 2.246 | 2.935 |
| Molded body |  | Sdr |  | 0.0013 | 0.0018 | 0.0022 | 0.0032 | 0.0027 |
|  |  | Scorch mail (discoloration) |  | ◯ | ◯ | ◯ | ◯ | ◯ |
|  |  | Surface shape (unevenness) |  | ◯ | ◯ | ◯ | Δ | ◯ |
|  |  | Continuous productivity (hr) |  | 7.5 | 5.1 | 6.5 | 4.1 | 5 |

|  |  |  |  | Examples | | |
|---|---|---|---|---|---|---|
|  |  |  |  | 11 | 12 | 13 |
| Production method | Raw material | Average degree of polymerization |  | 450 | 1500 | 2100 |
|  | PVC | Charge amount | kg | 50 | 50 | 50 |
|  | Water | Ion-exchanged water | kg | 130 | 130 | 130 |
|  | Chlorination conditions | Reaction temperature | ° C. | 100 | 100 | 100 |
|  |  | Reacton pressure | Mpa | 0.40 | 0.40 | 0.40 |
|  |  | PVC + water | kg | 180 | 180 | 180 |
|  |  | Vortex volume in stirring | L | 7.5 | 7.5 | 7.5 |
|  |  | Vortex volume/(PVC + water) | L/kg | 0.042 | 0.042 | 0.042 |
|  |  | (Distance from liquid surface to stirring blade)/ Height of liquid surface | m/m | 0.365 | 0.365 | 0.365 |
|  |  | Average chlorine consumption rate | kg/pvc − kg · 5 min | 0.009 | 0.011 | 0.012 |
|  |  | 200 ppm hydrogen peroxide | ppm/hr | 15 | 15 | 15 |
|  |  | Peak wavelength | nm | — | — | — |
| Chlorinated polyvinyl chloride |  | Amount of added chlorine | mass % | 10.5 | 10.5 | 9.7 |
|  | Structure | Structural unit (a) —CH$_2$—CHCl— | mol % | 35.2 | 30.2 | 40.2 |
|  |  | Structural unit (b) —CH$_2$—CCl$_2$— | mol % | 24 | 23.5 | 22.2 |
|  |  | Structural unit (c) —CHCl—CHCl— | mol % | 40.8 | 46.3 | 37.6 |
|  | DSC | Start temperature (L) | ° C. | 104 | 92 | 83 |
|  |  | End temperature (H) | ° C. | 153 | 163 | 173 |
|  |  | H − L | ° C. | 49 | 71 | 90 |
|  |  | Maximum heat flow difference | W/g | 0.00030 | 0.00022 | 0.00020 |
|  |  | Minimum heat flow difference | W/g | 0.00009 | 0.00008 | 0.00010 |
|  |  | Amount of absorbed heat | J/g | 3.022 | 3.005 | 3.032 |

TABLE 1-continued

| | | | | | |
|---|---|---|---|---|---|
| Molded body | Sdr | | 0.0020 | 0.0022 | 0.0023 |
| | Scorch mail (discoloration) | | ○ | ○ | ○ |
| | Surface shape (unevenness) | | ○ | ○ | ○ |
| | Continuous productivity (hr) | | 4.4 | 4.5 | 4 |

TABLE 2

| | | | | Comparative Examples | | | | |
|---|---|---|---|---|---|---|---|---|
| | | | | 1 | 2 | 3 | 4 | 5 |
| Production method | Raw material | Average degree of polymerization | | 1000 | 1000 | 1000 | 1000 | 350 |
| | PVC | Charge amount | kg | 50 | 50 | 50 | 50 | 50 |
| | Water | Ion-exchanged water | kg | 130 | 130 | 130 | 130 | 130 |
| | Chlorination conditions | Reaction temperature | °C. | 80 | 140 | 100 | 100 | 100 |
| | | Reaction pressure | Mpa | 0.04 | 0.40 | 0.40 | 0.40 | 0.40 |
| | | PVC + water | kg | 180 | 180 | 180 | 180 | 180 |
| | | Vortex volume in stirring | L | 0.9 | 32 | 1.1 | 27 | 28.8 |
| | | Vortex volume/(PVC + water) | L/kg | 0.005 | 0.178 | 0.006 | 0.150 | 0.160 |
| | | (Distance from liquid surface to stirring blade)/Height of liquid surface | m/m | 0.032 | 0.980 | 0.040 | 0.750 | 0.905 |
| | | Average chlorine consumption rate | kg/pvc – kg · 5 min | 0.010 | 0.030 | 0.006 | 0.150 | 0.018 |
| | | 200 ppm hydrogen peroxide | ppm/hr | — | 50 | 15 | 15 | 15 |
| | | Peak wavelength | nm | 365 | — | — | — | — |
| Chlorinated polyvinyl chloride | Amount of added chlorine | | mass % | 10.6 | 10.5 | 10.5 | 2.5 | 10.5 |
| | Structure | Structural unit (a) —CH$_2$—CHCl— | mol % | 34.1 | 34.2 | 34.6 | 84.4 | 36 |
| | | Structural unit (b) —CH$_2$—CCl$_2$— | mol % | 31.1 | 41 | 40.7 | 5 | 32 |
| | | Structural unit (c) —CHCl—CHCl— | mol % | 34.8 | 24.8 | 24.7 | 10.6 | 32 |
| | DSC | Start temperature (L) | °C. | 109 | 74 | 105 | 75 | 72 |
| | | End temperature (H) | °C. | 146 | 173 | 144 | 104 | 172 |
| | | H − L | °C. | 37 | 99 | 39 | 30 | 100 |
| | | Maximum heat flow difference | W/g | 0.00039 | 0.00020 | 0.00039 | 0.00020 | 0.00045 |
| | | Minimum heat flow difference | W/g | 0.00007 | 0.00002 | 0.00007 | 0.00006 | 0.00011 |
| | | Amount of absorbed heat | J/g | 3.052 | 2.462 | 3.462 | 3.982 | 3.210 |
| Molded body | | Sdr | | 0.0063 | 0.0121 | 0.0082 | 0.0048 | 0.0051 |
| | | Scorch mark (discoloration) | | x | x | x | x | x |
| | | Surface shape (unevenness) | | x | x | x | x | x |
| | | Continuous productivity (hr) | | 2 | 1.5 | 2.5 | 3 | 2.2 |

| | | | | Comparative Examples | | | |
|---|---|---|---|---|---|---|---|
| | | | | 6 | 7 | 8 | 9 |
| Production method | Raw material | Average degree of polymerization | | 1000 | 1000 | 1000 | 1000 |
| | PVC | Charge amount | kg | 50 | 50 | 50 | 50 |
| | Water | Ion-exchanged water | kg | 130 | 130 | 130 | 130 |
| | Chlorination conditions | Reaction temperature | °C. | 100 | 100 | 100 | 100 |
| | | Reaction pressure | Mpa | 0.40 | 0.40 | 0.40 | 0.40 |
| | | PVC + water | kg | 180 | 180 | 180 | 180 |
| | | Vortex volume in stirring | L | 1.9 | 1.4 | 25.2 | 26.5 |

TABLE 2-continued

| | | | | | | | |
|---|---|---|---|---|---|---|---|
| | | Vortex volume/ (PVC + water) | L/kg | 0.011 | 0.008 | 0.140 | 0.147 |
| | | (Distance from liquid surface to stirring blade)/Height of liquid surface | m/m | 0.040 | 0.052 | 0.800 | 0.690 |
| | | Average chlorine consumption rate | kg/pvc – kg · 5 min | 0.004 | 0.004 | 0.016 | 0.016 |
| | | 200 ppm hydrogen peroxide | ppm/hr | 15 | 15 | 15 | 15 |
| | | Peak wavelength | nm | — | — | — | — |
| Chlorinated polyvinyl chloride | Amount of added chlorine | | mass % | 10.5 | 10.6 | 10.3 | 10.5 |
| | Structure | Structural unit (a) —$CH_2$—CHCl— | mol % | 35.2 | 35.2 | 35.2 | 35.3 |
| | | Structural unit (b) —$CH_2$—$CCl_2$— | mol % | 40.2 | 41 | 29 | 28 |
| | | Structural unit (c) —CHCl—CHCl— | mol % | 24.6 | 23.8 | 35.8 | 36.7 |
| | DSC | Start temperature (L) | °C. | 104 | 104 | 75 | 75 |
| | | End temperature (H) | °C. | 144 | 145 | 174 | 174 |
| | | H − L | °C. | 41 | 42 | 99 | 99 |
| | | Maximum heat flow difference | W/g | 0.00038 | 0.00037 | 0.00020 | 0.00020 |
| | | Minimum heat flow difference | W/g | 0.00007 | 0.00007 | 0.00006 | 0.00006 |
| | | Amount of absorbed heat | J/g | 3.122 | 3.154 | 3.284 | 3.280 |
| Molded body | | Sdr | | 0.0045 | 0.0042 | 0.0039 | 0.004 |
| | | Scorch mark (discoloration) | | x | x | x | x |
| | | Surface shape (unevenness) | | Δ | Δ | Δ | Δ |
| | | Continuous productivity (hr) | | 3.5 | 3.4 | 3.5 | 3.5 |

INDUSTRIAL APPLICABILITY

The present invention can provide a chlorinated polyvinyl chloride that enables excellent continuous productivity in molding and that enables a molded article to have both processability and unevenness-preventing properties.

The invention claimed is:

1. A chlorinated polyvinyl chloride having an endothermic peak start temperature (L) and an endothermic peak end temperature (H) that satisfy the following expression (1) in endothermic peak measurement using a differential scanning calorimeter (DSC): 41° C.≤H−L≤98° C. (1), wherein the chlorinated polyvinyl chloride contains units (a) to (c) represented by the following formulas (a) to (c), and the proportion of the structural unit (a) is 30.0 mol % or higher and 90.0 mol % or lower, the proportion of the structural unit (b) is 5.0 mol % or higher and 30.0 mol % or lower, and the proportion of the structural unit (c) is 5.0 mol % or higher and 55.0 mol % or lower, relative to the total number of moles of the structural units (a), (b), and (c)

—$CH_2$—CHCl— (a)

—$CH_2$—$CCl_2$— (b)

—CHCl=CHCl— (c), and wherein the endothermic peak start temperature (L) is 77.3° C. or higher and 103.6° C. or lower, or wherein the endothermic peak end temperature (H) is 151.8° C. or higher and 166.1° C. or lower.

2. A resin composition for molding comprising the chlorinated polyvinyl chloride according to claim 1.

3. A molded body molded from the resin composition for molding according to claim 2.

* * * * *